(12) United States Patent
Brizard

(10) Patent No.: US 9,470,814 B2
(45) Date of Patent: Oct. 18, 2016

(54) SEISMIC METHODS AND SYSTEMS EMPLOYING FLANK ARRAYS IN WELL TUBING

(71) Applicant: CGGVERITAS SERVICES SA, Massy (FR)

(72) Inventor: Thierry Brizard, Massy (FR)

(73) Assignee: CGG SERVICES SA, Massy (FR)

( * ) Notice: Subject to any disclaimer, the term of this patent is extended or adjusted under 35 U.S.C. 154(b) by 743 days.

(21) Appl. No.: 13/848,139

(22) Filed: Mar. 21, 2013

(65) Prior Publication Data
US 2013/0250722 A1    Sep. 26, 2013

Related U.S. Application Data

(60) Provisional application No. 61/613,618, filed on Mar. 21, 2012.

(51) Int. Cl.
*G01V 1/40* (2006.01)
*G01V 1/52* (2006.01)
*G01V 1/44* (2006.01)

(52) U.S. Cl.
CPC . *G01V 1/44* (2013.01); *G01V 1/52* (2013.01); *G01V 2001/526* (2013.01)

(58) Field of Classification Search
CPC ..... G01V 1/52; G01V 11/002; E21B 47/011; E21B 23/04; E21B 17/1035; E21B 17/1028
USPC ................................. 181/102, 105
See application file for complete search history.

(56) References Cited

U.S. PATENT DOCUMENTS

| | | | |
|---|---|---|---|
| 4,133,378 A | 1/1979 | Gano | |
| 4,986,350 A * | 1/1991 | Czernichow | E21B 47/011 166/65.1 |
| 5,128,898 A * | 7/1992 | Hill | E21B 47/02208 181/104 |
| 5,363,094 A * | 11/1994 | Staron | G01V 11/002 166/254.2 |
| 5,503,225 A * | 4/1996 | Withers | B09B 1/008 166/250.1 |

(Continued)

FOREIGN PATENT DOCUMENTS

| | | |
|---|---|---|
| GB | 2 366 578 A | 3/2002 |
| GB | 2 443 374 A | 4/2008 |
| WO | 2009/032504 A1 | 3/2009 |

OTHER PUBLICATIONS

"Long range passive detection, classification and localization of silent targets, in deep and littoral waters", Submarine Warfare, 2012, Thales Underwater Systems SAS, TUS SAS/2012/M&5/0007, RO1.

(Continued)

*Primary Examiner* — Ian J Lobo
(74) *Attorney, Agent, or Firm* — Patent Portfolio Builders PLLC

(57) ABSTRACT

Systems and method described herein provide for obtaining information which can be used to create a seismic image of a portion of the earth surrounding a well. A device for obtaining information for creating a seismic image proximate a well includes at least one set of acoustic transducers mounted to an exterior surface of a well tubing and configured to transmit at least one acoustic signal, at least one set of hydrophones mounted to the exterior surface of the well tubing and configured to receive at least one reflected acoustic signal; and a cable configured to convey information to and from the at least one set of acoustic transducers and the at least one set of hydrophones.

18 Claims, 7 Drawing Sheets

(56) References Cited

U.S. PATENT DOCUMENTS

| | | | | |
|---|---|---|---|---|
| 5,771,170 A | * | 6/1998 | Withers | G01V 1/008 |
| | | | | 702/14 |
| 5,934,373 A | * | 8/1999 | Warpinski | E21B 43/26 |
| | | | | 166/250.1 |
| 6,131,658 A | * | 10/2000 | Minear | E21B 17/1028 |
| | | | | 166/250.01 |
| 6,182,012 B1 | * | 1/2001 | Laurent | G01V 1/047 |
| | | | | 702/6 |
| 6,244,375 B1 | * | 6/2001 | Norris | G01V 1/42 |
| | | | | 166/250.01 |
| 6,302,204 B1 | | 10/2001 | Reimers et al. | |
| 6,374,913 B1 | * | 4/2002 | Robbins | E21B 47/124 |
| | | | | 166/113 |
| 6,480,000 B1 | * | 11/2002 | Kong | E21B 47/01 |
| | | | | 166/66 |
| 7,095,676 B2 | * | 8/2006 | D'Angelo et al. | 367/31 |
| 2004/0112595 A1 | | 6/2004 | Bostick, III et al. | |
| 2004/0216872 A1 | * | 11/2004 | Foster | E21B 47/01 |
| | | | | 166/250.01 |
| 2005/0023074 A1 | * | 2/2005 | Dubinsky | G01V 1/523 |
| | | | | 181/108 |
| 2005/0173111 A1 | * | 8/2005 | Bostick, III | E21B 47/011 |
| | | | | 73/152.16 |

OTHER PUBLICATIONS

International Search Report in corresponding International Application No. PCT/EP2013/055968 dated Sep. 6, 2013.

Written Opinion in corresponding International Application No. PCT/EP2013/055968 dated Sep. 6, 2013.

* cited by examiner

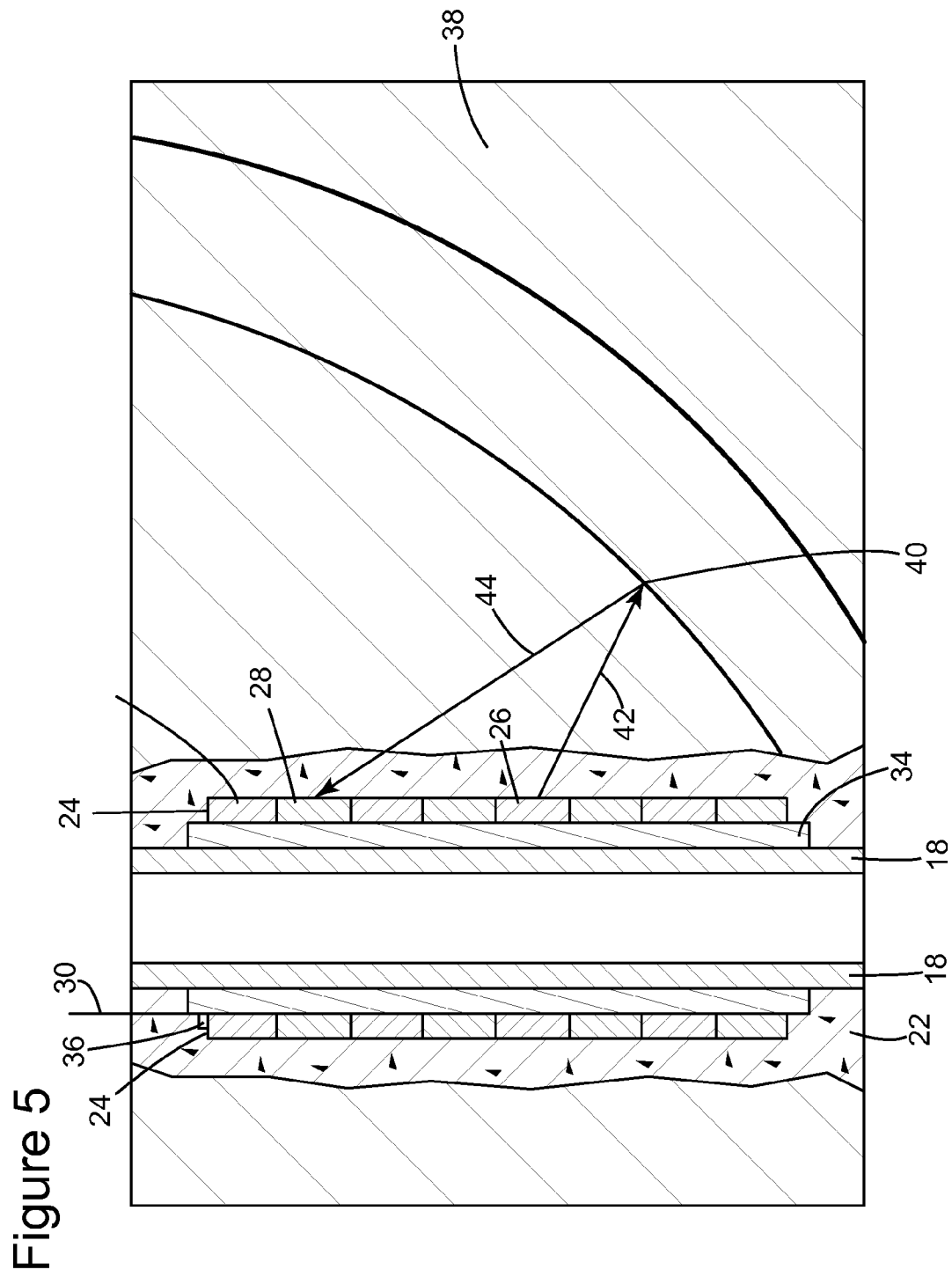

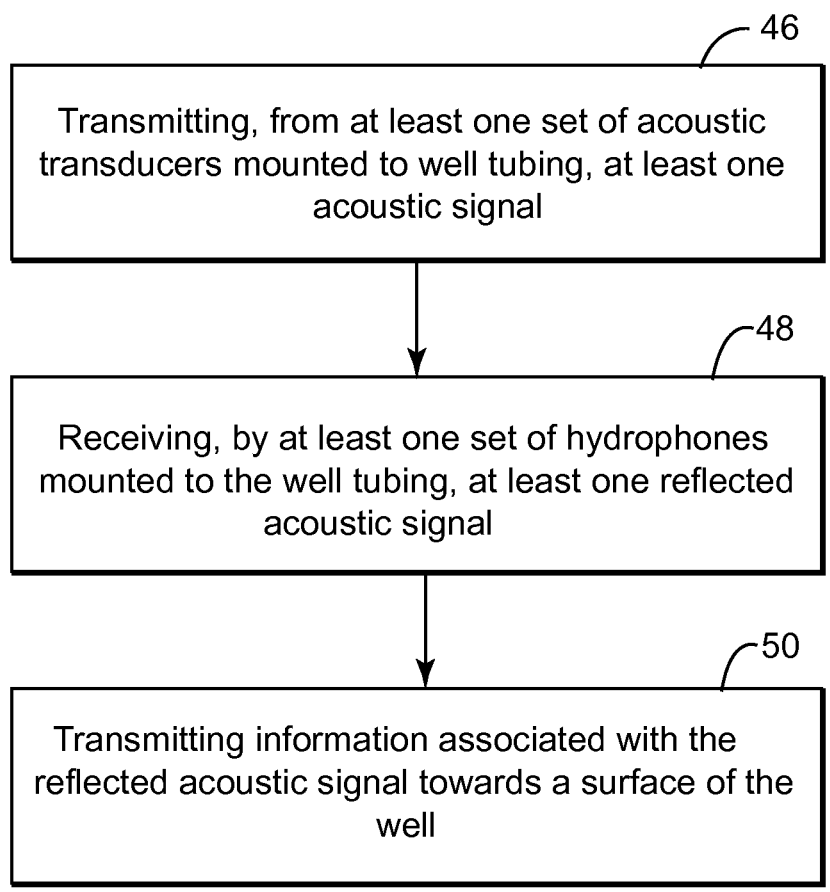

SEISMIC METHODS AND SYSTEMS EMPLOYING FLANK ARRAYS IN WELL TUBING

RELATED APPLICATION

The present application is related to, and claims priority from U.S. Provisional Patent Application No. 61/613,618, filed Mar. 21, 2012, entitled "Geo Flank Array", to Thierry Brizard, the disclosure of which is incorporated herein by reference.

TECHNICAL FIELD

The present invention relates generally to methods and systems which support seismic exploration and, more particularly, to seismic exploration mechanisms and techniques which employ a flank array.

BACKGROUND

In the oil and gas industry, energy sources can be used to generate acoustic, seismic signals which propagate into the earth. These seismic signals can reflect from various interfaces between different underground formations, which formations have different acoustic properties. The reflected seismic signals can then be recorded by sensors, e.g., geophone/hydrophone sensors, for use in determining potential locations of underground hydrocarbon reservoirs of, for example, natural gas and oil. Once hydrocarbon reservoirs have been put into production, it is often desirable to be able to obtain ongoing seismic measurements to monitor characteristics of the underground hydrocarbon reservoir over time. For example, obtaining seismic data when (or before and after) injecting steam into the sand associated with the hydrocarbon reservoir may be desirable. Similarly, so-called 4D surveying, which adds a temporal dimension to the survey to show the status of hydrocarbon deposits over time, has recently become a popular tool to enable producers to more effectively extract hydrocarbons from their fields.

There are numerous examples of seismic surveying systems, both land and marine, which employ acoustic sources and receivers to image underground geologic structures. Complex processing algorithms are used to take the raw, received seismic signal data, and transform that data into images which can be used by those skilled in the art to determine where hydrocarbon reservoirs are likely to be located and how those hydrocarbon reservoirs change over time.

However, the generation and reception of acoustic signals has also been researched and implemented in fields of endeavor other than seismic surveying, such as various forms of sonar systems and arrays used by naval vessels. For example, as shown in FIG. 1, a submarine 2 is depicted with various sonar and receiving array systems. The submarine 2 shows an active system, e.g., a high frequency sonar system 4, as well as a plurality of passive systems, e.g., a towed array 6, a spherical array 8, a hull array 10 and a flank array 12. The flank array 12 is a relatively new type of array which allows for sonar sensors to be glued to the pressure hull of the submarine 2 while correcting for, e.g., noise and vibration issues associated with the generation and reception of acoustic signals proximate the pressure hull.

The example of the use of flank arrays shown in FIG. 1 can be described as an example of progress with respect to understanding and implementing the flank array technology in sonar and submarines. In a similar fashion, improvements have occurred over time in the use of acoustic signals in the oil field industry for seismic surveying. However, to date, flank array technology has not been implemented in seismic surveying equipment.

SUMMARY

According to various embodiments described below, flank array technology is beneficially employed in downhole well tubing to provide, for example, the capability to image an area surrounding the well tubing and thereby update the well owner on the changing characteristics of the hydrocarbon reservoir which the well is extracting. Such embodiments may have other benefits which will be apparent to those skilled in the art, e.g., initial and detailed imaging of a hydrocarbon deposit after the well tubing is deployed but prior to hydrocarbon extraction. However, the embodiments described below which combine flank array technology, seismic surveying technology and well technology (sometimes referred to herein as a "Geo Flank Array") are not limited to those embodiments which provide one or more of these benefits.

According to an embodiment, there is a device for device for obtaining information for creating a seismic image proximate a well, the device including: at least one set of acoustic transducers mounted to an exterior surface of a well tubing and configured to transmit at least one acoustic signal; at least one set of hydrophones mounted to the exterior surface of the well tubing and configured to receive at least one reflected acoustic signal; and a cable configured to convey information to and from the at least one set of acoustic transducers and the at least one set of hydrophones.

According to another embodiment, there is a method for obtaining information usable to create a seismic image proximate a well, the method comprising transmitting, from at least one set of acoustic transducers mounted to well tubing, at least one acoustic signal; receiving, by at least one set of hydrophones mounted to the well tubing, at least one reflected acoustic signal; and transmitting information associated with the reflected acoustic signal towards a surface of the well.

BRIEF DESCRIPTION OF THE DRAWINGS

The accompanying drawings illustrate exemplary embodiments, wherein:

FIG. 5 shows the Geo flank array in its operating location according to an exemplary embodiment; and FIG. 6 is a flowchart illustrating a method of operating a Geo flank array according to an exemplary embodiment.

DETAILED DESCRIPTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics described herein may be combined in any suitable manner in one or more embodiments.

Figure 1:
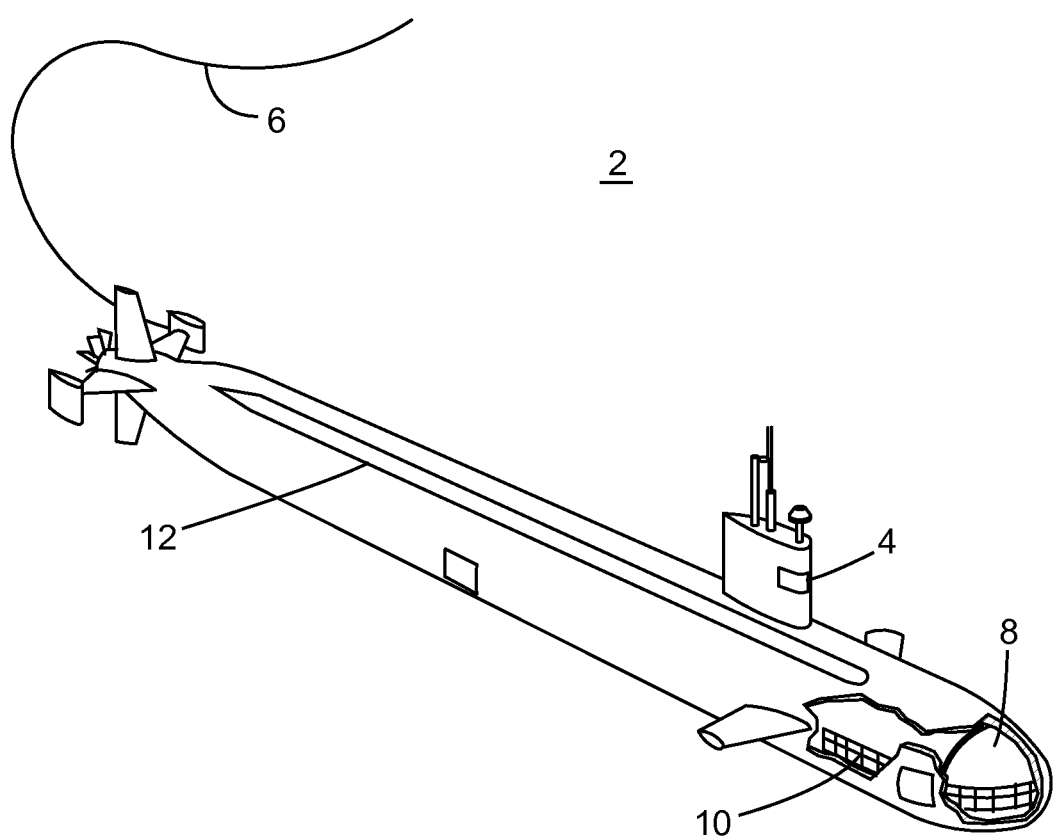
FIG. 1 depicts various sonar systems associated with a submarine.
Figure 2A:
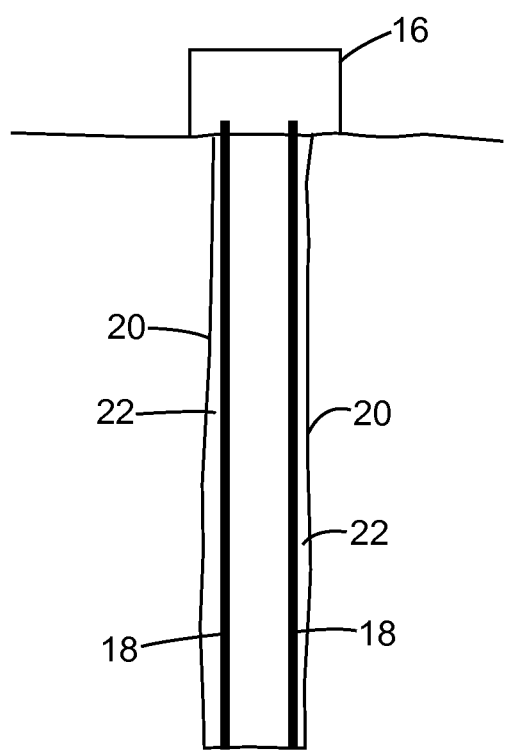
FIG. 2(a) shows a capped well according in which embodiments can be implemented.

According to exemplary embodiments, sound, e.g., acoustic signals, can be used in support of hydrocarbon exploration and exploitation by providing flank arrays to well tubing and using the combination to explore the seismic characteristics of the cylindrical region surrounding the well tubing. Prior to discussing exemplary systems and methods which combine flank arrays, seismic surveying, and well technologies to accomplish this, an environment where the monitoring of transmission and reception of acoustic signals using such embodiments will first be discussed. FIG. 2(a) shows a highly generalized, and purely illustrative, capped well 14. The capped well includes a blowout preventer 16 covering the capped well 14. In the capped well 14 there is tubing 18. The tubing 18 is variously referred to herein as "tubing", "well tubing" and "downhole tubing". Between the tubing 18 and the wall 20 of the capped well there is cement 22. While shown in FIG. 2(a) as a land-based capped well 14, embodiments described herein can also be used in undersea wells.

The generalized, capped well 14 of FIG. 2(a) is illustrated and described here to provide a very generic embodiment of a well system to which a Geo flank array can be added. However, those skilled in the art will appreciate that well systems are more complex than that described above with respect to FIG. 2(a). In order to exemplify such more complex well systems, but without limiting these embodiments thereto, FIG. 2(b) provides a more detailed example of a well system in which Geo flank array technology according to various embodiments may be deployed.

Therein, the well 100 is lined by a system of concentric casing strings 101-104. The concentric casing strings 101-104 serve a number of purposes, including preventing caving in of the drilled well 100 and preventing fluids from flowing into the well 100 which are associated with formations other than those intended to be extracted. As also shown in FIG. 2(b), the well 100 includes various pipes 121-123, valves and seals which provide for fluid communication between the well head and various areas within the concentric casings 101-104, the details of which the interested reader can find in U.S. Pat. No. 4,133,378 (from which FIG. 2(b) has been reproduced), and the disclosure of which is incorporated here by reference.

Figure 2B:
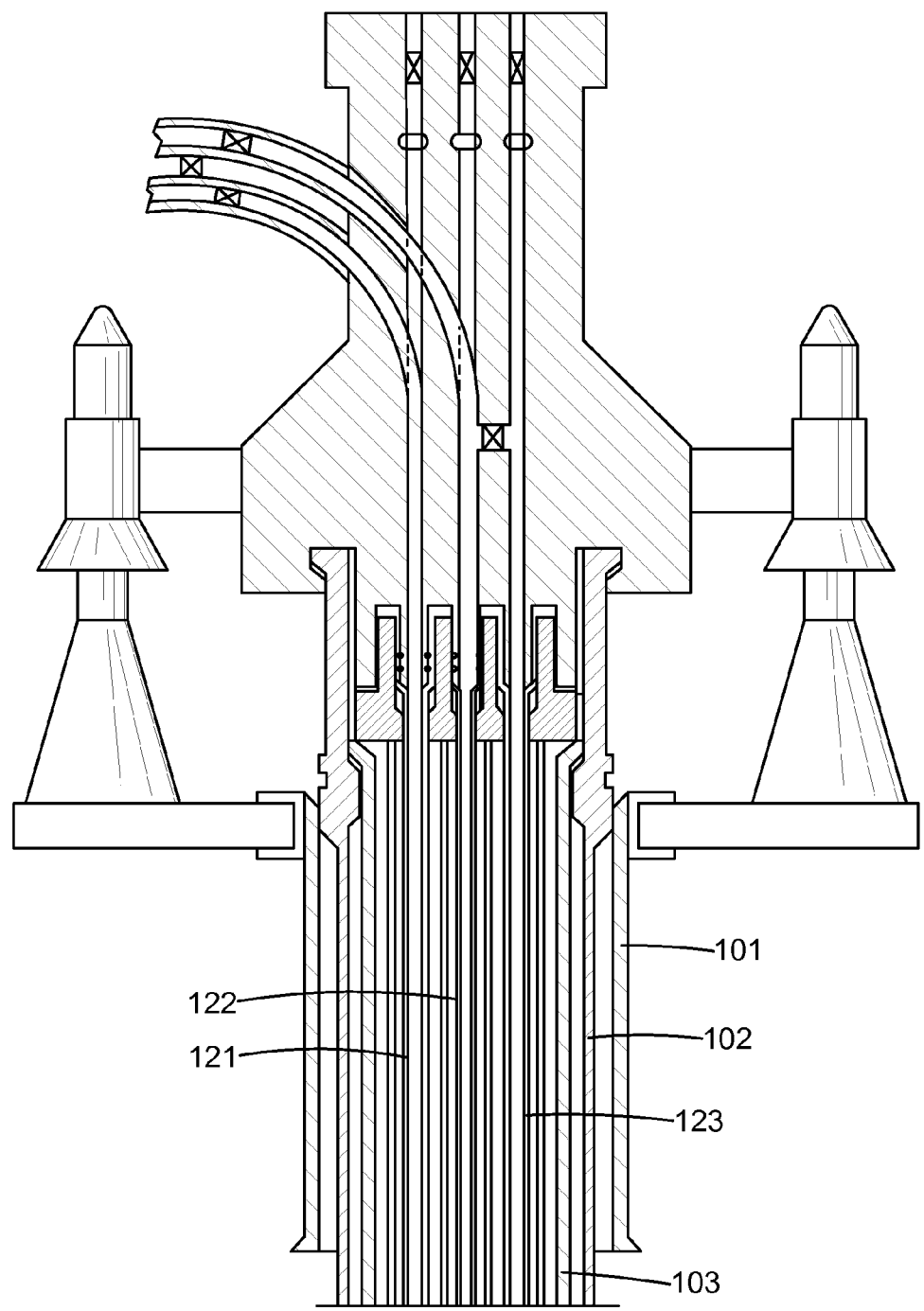
FIG. 2(b) depicts a more complex well tubing in which embodiments can be implemented.

Having now described various environments in which these embodiments can be employed, a Geo flank array can be added to, for example, the capped well 14 of FIG. 2(a) or well 100 of FIG. 2(b), in support of gathering seismic data which can be used to create seismic images of a portion of the earth surrounding the downhole tubing 18, casing strings 101-104, or any other outer surface of a well tubing. As described previously, seismic imagery provided by the Geo flank array can assist in identifying the location and extent of hydrocarbons and other geological features in the vicinity of the Geo flank array. An exemplary Geo flank array is shown in FIG. 3 and will now be described.

According to an exemplary embodiment, the Geo flank array 24 is a device which can be mounted onto the tubing 18 or one or more of the outer casing strings 101-104, e.g., prior to inserting the tubing into a drilled well. The Geo flank array 24 shown in this embodiment includes a plurality of rings of transducers 26 and a plurality of rings of hydrophones 28. An acoustic barrier 34 can be placed between the tubing 18 and the Geo flank array 24. The Geo flank array 24 can include connecting cables (not shown) and can be mounted around the acoustic barrier 34 and the tubing 18 on the surface. When the Geo flank array 24 is placed into its desired position in the well, the Geo flank array, as well as the acoustic barrier 34, can be more fully attached via an outer layer of cement to the tubing 18. There is also a cable 30 provided in this embodiment which allows for information to be transmitted in either direction as shown by the arrows 32. The information can include instructions for activating the transducers 26 which can be generated by a device (not shown) at the surface as well as any signal information received by the rings of hydrophones 28. A processor 36 can also be provided as a part of the Geo flank array 24 to be used in processing received acoustic signals. The processor 36 can be positioned proximate the Geo flank array 24 or at some other position within or outside of the well. The processing performed by processor 36 can include, but is not limited to, conditioning, digitizing and/or multiplexing of the acoustic signals received by the hydrophones 28.

Figure 3:
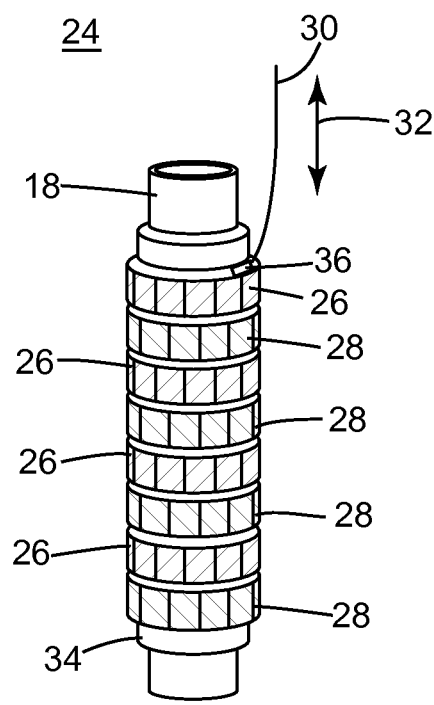
FIG. 3 illustrates a Geo flank array according to an exemplary embodiment.
Figure 4:
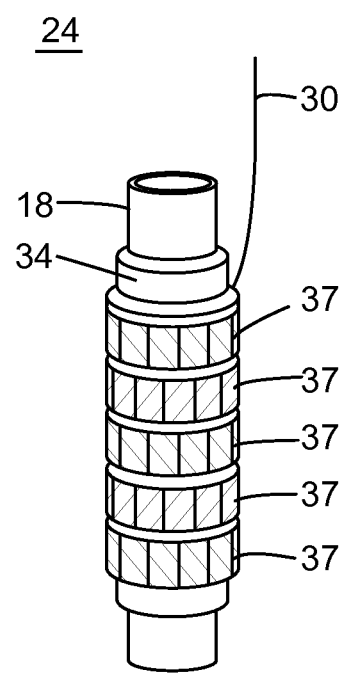
FIG. 4 illustrates another Geo flank array according to an exemplary embodiment.

While the embodiment shown in FIG. 3 has four rings of transducers 26 and four rings of hydrophones 28 distributed in an interlaced pattern, other combinations of acoustic signal sources and receivers are possible. For example, more or fewer rings of either transducers 26 (sources) and/or hydrophones (receivers) 28 can be used. Different patterns for placing such rings on the well tubing can also be used, e.g., irregular or non-interlaced rings. Additionally, according to an alternative exemplary embodiment, a same piezoelectric element could be used as a combined transducer/hydrophone element for the Geo flank array 24, rings of which could mounted around the tubing 18 or casing strings 101-104. This alternative embodiment can be seen in FIG. 4, where the Geo flank array 24 includes rings of the same piezoelectric combined source/receiver elements 37. Indeed, the sources and receivers need not even be placed in rings around the tubing but, more generally, are sets of sources 26 and receivers 28 adhered or mounted to the acoustic barrier layer 34. The sources 26 and receivers 28 may be placed along the entirety of the length of the well tubing or only along a predetermined portion of the well tubing, e.g., corresponding to one or more predetermined depths at which imaging of the ground formations is desired for a particular well.

In operation, as shown in FIG. 5, the Geo flank array 24 with acoustic barrier 34 is cemented to the tubing 18 and is located downhole in the capped well 14 or 100. Instructions or commands are transmitted from the surface (from a control station, not shown) via cable 30 to the Geo flank array 24. These instructions result in one or more of the transducers 26 transmitting an acoustic signal 42 away from the well tubing to which the Geo flank array 24 is attached, and which acoustic signal is reflected by a reflector or interface 40 representing a change in the geologic structure in the ground 38, as shown in FIG. 5 by reflected acoustic signal 44. Reflected acoustic signal 44 is received by one or more of the hydrophones 28 on the Geo flank array 24. The reflected acoustic signal 44 can be processed, e.g., conditioned, digitized and/or multiplexed by the processor 36 prior to be transmitted via the cable 30 to the surface. Alternatively, all of the processing of the received signals can take place in a device at the surface (not shown) with such processing capabilities. The signal information can then be accumulated and transformed into a seismic image of the subsurface using known seismic data processing techniques.

A method for obtaining information usable to create a seismic image proximate a well using a Geo flank array according to an embodiment is illustrated in FIG. 6. Therein, at step 46, at least one acoustic signal (46) is transmitted from at least one set of acoustic transducers mounted to well tubing. At least one reflected acoustic signal is received (step 48) by at least one set of hydrophones mounted to the well tubing. Information associated with the reflected acoustic signal is transmitted (step 50) towards a surface of the well.

The above-described exemplary embodiments are intended to be illustrative in all respects, rather than restrictive, of the present invention. Thus the present invention is capable of many variations in detailed implementation that can be derived from the description contained herein by a person skilled in the art. No element, act, or instruction used in the description of the present application should be construed as critical or essential to the invention unless explicitly described as such. Also, as used herein, the article "a" is intended to include one or more items.

What is claimed is:

1. A device for obtaining information usable to create a seismic image proximate a well, the device comprising:
   at least one set of acoustic transducers mounted to an exterior surface of a well tubing and configured to transmit at least one acoustic signal;
   at least one set of hydrophones mounted to the exterior surface of the well tubing and configured to receive at least one reflected acoustic signal; and
   a cable configured to convey information to and from the at least one set of acoustic transducers and the at least one set of hydrophones,
   wherein the exterior surface of the well tubing is cemented to the well,
   wherein the at least one set of acoustic transducers and the at least one set of hydrophones are disposed in rings formed into an interlacing pattern on the exterior surface of the well tubing.

2. The device of claim 1, further comprising:
   an acoustic barrier disposed between the combination of the at least one set of acoustic transducers and the at least one set of hydrophones, and the exterior surface of the well tubing.

3. The device of claim 2, wherein the device and the acoustic barrier are attached to the tubing with cement.

4. The device of claim 1, further comprising:
   a processor configured to perform at least one of conditioning, digitizing or multiplexing the at least one received reflected acoustic signal resulting in a processed acoustic signal.

5. The device of claim 4, wherein the processed acoustic signal is transmitted through the cable to another device which creates the seismic image based on one or more received processed acoustic signals.

6. The device of claim 1, wherein the at least one set of acoustic transducers and the at least one set of hydrophones are disposed on the exterior surface of the well tubing in a non-interlacing pattern.

7. The device of claim 1, wherein the at least one set of acoustic transducers and the at least one set of hydrophones include a plurality of elements which are configured to perform the functions of both an acoustic transducer and a hydrophone.

8. The device of claim 1, wherein the device is located in a drilled hole in a hydrocarbon field.

9. The device of claim 1, wherein the at least one set of acoustic transducers is fixedly cemented to the exterior surface of the well tubing.

10. The device of claim 1, wherein the at least one set of hydrophones is fixedly cemented to the exterior surface of the well tubing.

11. A method for obtaining information usable to create a seismic image proximate a well, the method comprising:
    transmitting, from at least one set of acoustic transducers mounted to an exterior surface of a well tubing, at least one acoustic signal;
    receiving, by at least one set of hydrophones mounted to the exterior surface of the well tubing, at least one reflected acoustic signal;
    transmitting information associated with the reflected acoustic signal towards a surface of the well;
    wherein the exterior surface of the well tubing is cemented to the well,
    forming, with at least one ring of acoustic transducers and at least one ring of hydrophones, an interlacing pattern on the well tubing.

12. The method of claim 11, wherein an acoustic barrier is disposed between the combination of the at least one set of acoustic transducers and the at least one set of hydrophones, and the well tubing.

13. The method of claim 12, further comprising:
    attaching the combination of the at least one set of acoustic transducers and the at least one set of hydrophones and the acoustic barrier to the tubing with cement.

14. The method of claim 11, further comprising:
    performing, by a processor, at least one conditioning, digitizing or multiplexing operation on the at least one received reflected acoustic signal.

15. The method of claim 14, further comprising:
    transmitting the processed signal through a cable to a device which creates the seismic image based on one or more received, processed acoustic signals.

16. The method of claim 11, further comprising:
    forming, with the at least one set of acoustic transducers and the at least one set of hydrophones, a non-interlacing pattern on the well tubing.

17. The method of claim 11, further comprising:
    configuring an element to perform the functions of both an acoustic transducer and a hydrophone such that the at least one set of acoustic transducers and at least one set of hydrophones comprise a set of said elements.

18. The method of claim 11, wherein the steps of transmitting at least one acoustic signal and receiving the at least one reflected acoustic signal is performed in a drilled hole in a hydrocarbon field.

* * * * *